(12) United States Patent
Dahl et al.

(10) Patent No.: US 10,033,295 B2
(45) Date of Patent: Jul. 24, 2018

(54) RECTIFIER WITH IMPROVED POWER FACTOR

(71) Applicant: ITW GSE APS, Odense N (DK)

(72) Inventors: Søren Risgaard Dahl, Odense SV (DK); Ronni Bøgebjerg Azulay, Odense SV (DK)

(73) Assignee: ITW GSE APS, Odensen (DK)

( * ) Notice: Subject to any disclaimer, the term of this patent is extended or adjusted under 35 U.S.C. 154(b) by 67 days.

(21) Appl. No.: 14/904,448

(22) PCT Filed: Jul. 10, 2014

(86) PCT No.: PCT/IB2014/062990
§ 371 (c)(1),
(2) Date: Jan. 12, 2016

(87) PCT Pub. No.: WO2015/004622
PCT Pub. Date: Jan. 15, 2015

(65) Prior Publication Data
US 2016/0149510 A1    May 26, 2016

(30) Foreign Application Priority Data
Jul. 12, 2013    (EP) .................................... 13176268

(51) Int. Cl.
*H02M 7/08*    (2006.01)
*H02M 7/06*    (2006.01)
(Continued)

(52) U.S. Cl.
CPC ........... *H02M 7/06* (2013.01); *H02M 1/4216* (2013.01); *H02M 1/4266* (2013.01); *H02M 7/08* (2013.01); *H02M 7/155* (2013.01); *Y02B 70/123* (2013.01)

(58) Field of Classification Search
CPC ............. H02M 1/4216; H02M 1/4266; H02M 1/4283; H02M 7/06; H02M 7/062;
(Continued)

(56) References Cited

U.S. PATENT DOCUMENTS 5,506,766 A * 4/1996 Takahashi ........... H02M 1/4216
                                                363/126
5,719,757 A * 2/1998 Beyerlein ........... H02M 1/4216
                                                323/211
(Continued)

FOREIGN PATENT DOCUMENTS

DE         19533556 C1    12/1996
JP         2003284343 A   10/2003

OTHER PUBLICATIONS

ISR and WO for PCT/US2014/062990 dated Sep. 1, 2014.
(Continued)

*Primary Examiner* — Timothy J Dole
*Assistant Examiner* — Bryan R Perez
(74) *Attorney, Agent, or Firm* — Hauptman Ham, LLP (57) ABSTRACT

A rectifier circuit being arranged for rectifying electrical power, comprising a three phase power input, a magnetic splitter circuit being arranged for receiving the three phase power input and splitting the three phase power into a first three phase system and a second three phase system, the first three phase system having signals lagging signals of the second three phase system, a twelve pulse rectifier with six input terminal to connect the first and the second three phase system, and to generate a rectified electrical power at a power output, a three phase inductance being connected in series with the three phase power input and the magnetic splitter circuit, and a plurality of power factor correction (PFC) capacitors, each comprising first and second terminals, said first terminals being connected to respective input terminals of the twelve pulse rectifier, and the second
(Continued)

terminals being connected to at least one common electrical point.

16 Claims, 10 Drawing Sheets

(51) Int. Cl.
*H02M 1/42* (2007.01)
*H02M 7/155* (2006.01)

(58) Field of Classification Search
CPC ........ H02M 7/066; H02M 7/068; H02M 7/08; H02M 5/40; H02M 5/453; H02M 5/458; H02M 5/4585; H02M 7/217; H02M 7/2176; H02M 7/155
See application file for complete search history.

(56) References Cited

U.S. PATENT DOCUMENTS

| | | |
|---|---|---|
| 2003/0223256 A1 | 12/2003 | Vithayathil |
| 2005/0146226 A1* | 7/2005 | Trainer .................. H02M 1/12 307/73 |
| 2006/0056207 A1 | 3/2006 | Sarlioglu |
| 2013/0181646 A1* | 7/2013 | Takata .................. H02M 1/12 318/400.29 |

OTHER PUBLICATIONS

European Extended Search Report for Euroepan Application No. 13176268A dated Nov. 26, 2013.

Chen et al., "Research of the current-injection-based P-type 12-pulse ATRU", 2012 IEEE 7th International Power Electronics and Motion Control Conference—ECCE Asia, Jun. 2-5, 2012, Harbin, China; Jun. 2, 2012, pp. 41-46.

Choi et al., "Polyphase transformer arrangements with reduced kVA capacities for harmonic current reduction in rectifier type utility interface", Power Electronics Specialists Conference, 1995. PESC '95 Record., 26th Annual IEEE Atlanta, GA, USA Jun. 18-22, 1995, vol. 1, Jun. 18, 1995, pp. 353-359.

\* cited by examiner

RECTIFIER WITH IMPROVED POWER FACTOR

RELATED APPLICATIONS

The present application is a National Phase of International Application Number PCT/IB2014/062990 filed Jul. 10, 2014 and claims priority to European Application Number 13176268.4 filed Jul. 12, 2013.

FIELD OF THE INVENTION

The present invention relates to a rectifier circuit for rectifying electrical power with high power factor. The invention also relates to a method for rectifying electrical power.

BACKGROUND

An efficient usage of electrical energy is the determining solution in order to avoid future electricity shortage problems. Power electronic systems deliver a major contribution to efficiency improvements.

The use of electrical rectifier circuits has been well known for many years. The more simple circuits, but yet more reliable ones are those with passive diodes, more advanced rectifiers uses fast switching transistors, in between there are endless combinations of both.

The required number of power electronic systems can only be installed, if the harmonic distortions, which are produced by these systems, can be minimised.

Although the trend over the last decades has been towards more advanced power electronic rectifiers with high frequency switching and minimized magnetic components, there are still many applications where simple power electronics combined with advanced magnetics outperform the other.

Increased regulatory requirements for better power factor and low harmonic distortion factor have challenged the circuit design; these regulatory requirements apply to many geographical areas, and thus a global design with good power factor is to prefer. The simple rectifiers of the prior art suffer from having a low power factor compared to the fast switching rectifier circuits with build in power factor correction. Thus there has been a need for circuits with improved power factor.

In the prior art tuned harmonic filters have been used to reduce harmonics, but they have limited performance and suffer from other disadvantages. Passive multi-phase current or voltage splitters are cost efficient, compact and highly reliable harmonics mitigation concepts for three-phase loads.

The adequate coupling of current splitting transformers allows for a massive reduction of the magnetic volume as well as for the replacement of complex circuits by one single component.

The power factor of an AC electrical power system is defined as the ratio of the real power flowing to the load, to the apparent power in the circuit. Thus a unity power factor can be reached when the voltage and current are in phase with each other.

The harmonic distortion is defined as the ratio of the sum of the powers of all harmonic components to the power of the fundamental frequency.

An objective of the invention can be seen as providing a rectifying circuit with a high power factor, especially during full load, furthermore it is also an objective to provide a rectifier that operates with an optimal power factor in a broad load range.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, the present invention relates a rectifier circuit being arranged for rectifying electrical power, comprising
- a three phase power input,
- a magnetic splitter circuit being arranged for receiving the three phase power input and splitting the three phase power into a first three phase system and a second three phase system, said first three phase system having signals lagging signals of the second three phase system,
- a twelve pulse rectifier with six input terminal to connect the first and the second three phase system, and to generate a rectified electrical power at a power output,
- a three phase inductance being connected in series with the three phase power input and the magnetic splitter circuit,
- a plurality of power factor correction (PFC) capacitors, each comprising first and second terminals, said first terminals being connected to respective input terminals of the twelve pulse rectifier, and said second terminals being connected to at least one common electrical point.

An advantage of the first aspect of the present invention is that the problem of having a low power factor with a diode rectifier seems to be solved, as a unity power factor can be obtained with a twelve pulse.

This is reached because of the use of the power factor correction capacitors connected to the circuit at the input terminals of the twelve pulse rectifier; provided with small capacitors.

The use of PFC capacitors in a rectifier has been used in the prior art, but they are connected to the rectifier circuit directly at its grid input terminals, which makes them prone to cause resonances together with other loads in the grid, it also requires much larger capacitors, for the same power factor correction. The PFC capacitors of the prior art do not provide similar side effects as seen with this present circuit, such as increased DC voltage level.

A further, but important advantage of the first aspect is an improved efficiency, as the rectified voltage level increases.

According to one embodiment of the invention the rectifier further comprises that the signals of the first and second three phase system, being a current signal.

An advantage of this embodiment is that using a current splitter instead of a voltage splitter, eliminates the need for an interphase reactor on the DC side of the rectifiers. Another advantage is that the physical dimensions of the magnetic circuits are smaller compared to the voltage splitting circuits.

According to one embodiment of the invention the rectifier further comprises that the plurality of PFC capacitors are selected to have capacitances serving the purposes of increasing a power factor of the three phase power input.

According to one embodiment of the invention the rectifier further comprises that the plurality of PFC capacitors comprises six capacitors, each having their first terminals connected to respective input terminals of the twelve pulse rectifier.

An advantage of this embodiment is that each of the capacitors corrects the current in the phase they are connected to, and thus the desired current displacement is obtained.

According to one embodiment of the invention the rectifier further comprises that the twelve pulse rectifier comprises a plurality of diode switches.

An advantage of this embodiment is that the rectifier is very reliable, well proven and has higher efficiency as the semiconductor conduction losses in the diodes are very low compared to losses in transistors.

According to one embodiment of the invention the rectifier further comprises that the twelve pulse rectifier consists of two six pulse rectifier bridges.

An advantage of this embodiment is that the rectifier can be constructed by using standard six pulse power electronic modules and that it is modular.

According to one embodiment of the invention the rectifier further comprises that the three phase inductances are separate magnetic components connected in series between the a three phase power input and the magnetic splitter circuit, said inductance having a value in the range of 0.1 p.u to 0.2 p.u.

An advantage of this embodiment is that the series impedance is big enough to limit the harmonic distortion, and at the same time not so big that the voltage drop over the inductance reduces the efficiency of the rectifier too much.

According to one embodiment of the invention the rectifier further comprises a second three phase inductance, wherein the three phase inductance is inserted in series between a first three phase system of the magnet splitter circuit and the rectifier, and the second three phase inductance is inserted in series between the second three phase system of the magnet splitter circuit and the rectifier.

According to one embodiment of the invention the rectifier further comprises that the three phase inductances are integrated in the magnetic splitter circuit, said magnetic splitter circuit comprises one or more air gap(s).

An advantage of this embodiment is that the integrated circuit can be more compact, but yet more complex.

According to one embodiment of the invention the rectifier further comprises that each of the plurality of PFC capacitors are arranged to be connected to the circuit through electrical switches.

An advantage of this embodiment is that the PFC capacitors can be connected to the circuit as needed.

According to one embodiment of the invention the rectifier further comprises that the electrical switches are arranged to be operated in an open mode, when the power output is below a threshold value.

An advantage of this embodiment is that the PFC capacitors are disconnected while the rectifier is operated at a low load, as the PFC capacitors mainly benefit the power factor at high loads.

According to one embodiment of the invention the rectifier further comprises that each of the plurality of PFC capacitors has a capacitance value in the range of 20 uF to 40 uF.

In a second aspect, the present invention relates use of the rectifier circuit according to the above mentioned aspect and its embodiment, wherein the rectifier circuit provides power to an air-conditioning unit or an air craft ground power supply unit.

The advantages of the second aspect and its further embodiments are equivalent to the advantages for the first aspect of the present invention.

In a third aspect, the present invention relates a method for rectifying electrical power to reduce a harmonic distortion factor and/or increasing a power factor, the method comprises:

Receiving a three phase power input, through three phase inductances, the three phase inductances being connected in series with the three phase power input and a magnetic splitter circuit, splitting the three phase power input in the magnetic splitter circuit, into a first three phase system and a second three phase system, said first three phase system having signals lagging signals of the second three phase system, correcting the power of the first and second three phase system by a plurality of PFC capacitors, each comprising first and second terminals, said first terminals connected to respective input terminals of a twelve pulse rectifier, and said second terminals connected to a common electrical point, rectifying the power of the first and second three phase system in the twelve pulse rectifier with six input terminal to connect the first and the second three phase system.

The advantages of the third aspect and its embodiments are equivalent to the advantages for the first aspect of the present invention.

The individual aspects of the present invention may each be combined with any of the other aspects. These and other aspects of the invention will be apparent from the following description with reference to the described embodiments.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

BRIEF DESCRIPTION OF THE FIGURES

The rectifier according to the invention will now be described in more detail with regard to the accompanying figures. The figures show one way of implementing the present invention and is not to be construed as being limiting to other possible embodiments falling within the scope of the attached claim set.

DETAILED DESCRIPTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 1A:
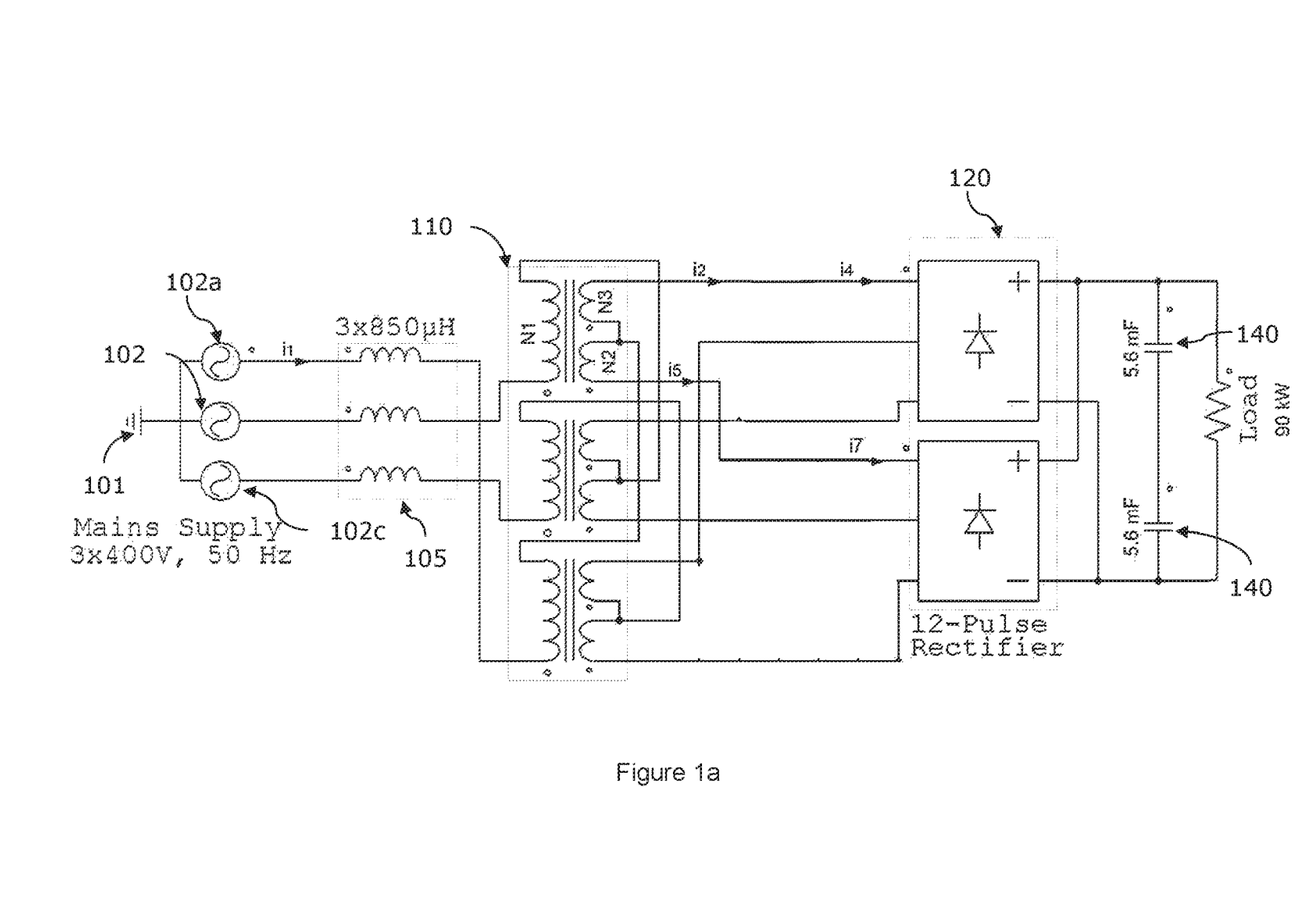
FIGS. 1(a) and 1(b) shows a rectifier circuit according to the prior art.

FIG. 1*a* shows a rectifier according to the prior art without Power Factor Correcting (PFC) capacitors for improving the power factor. The circuit comprises three current sources 102 connected to a common point 101, which could be ground. Three current sources 102 together with impedances (not shown) make Thévenin equivalents for an electrical supply. The supply is connected to a grid choke 105 which again is connected to a magnet current splitter circuit 110. The magnet current splitter 110 splits the supply current into six phases, i.e. three plus three phases. All the phases are displaced in respect to each other supplying a diode rectifier 120.

Figure 1B:
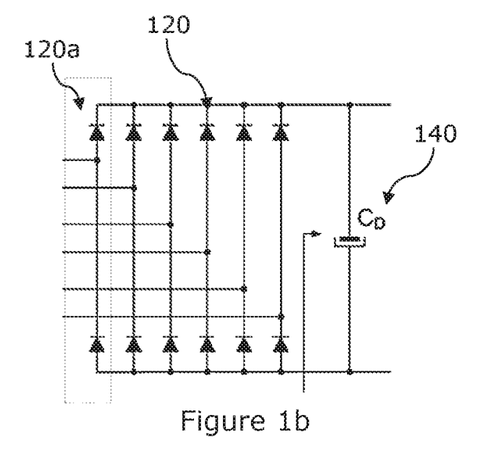

FIG. 1*b* shows that the diode rectifier consist of six rectifier branches, one of them 120*a*, the rectified DC power feed its power into a DC bus to which a capacitor 140 is connected.

Figure 2:
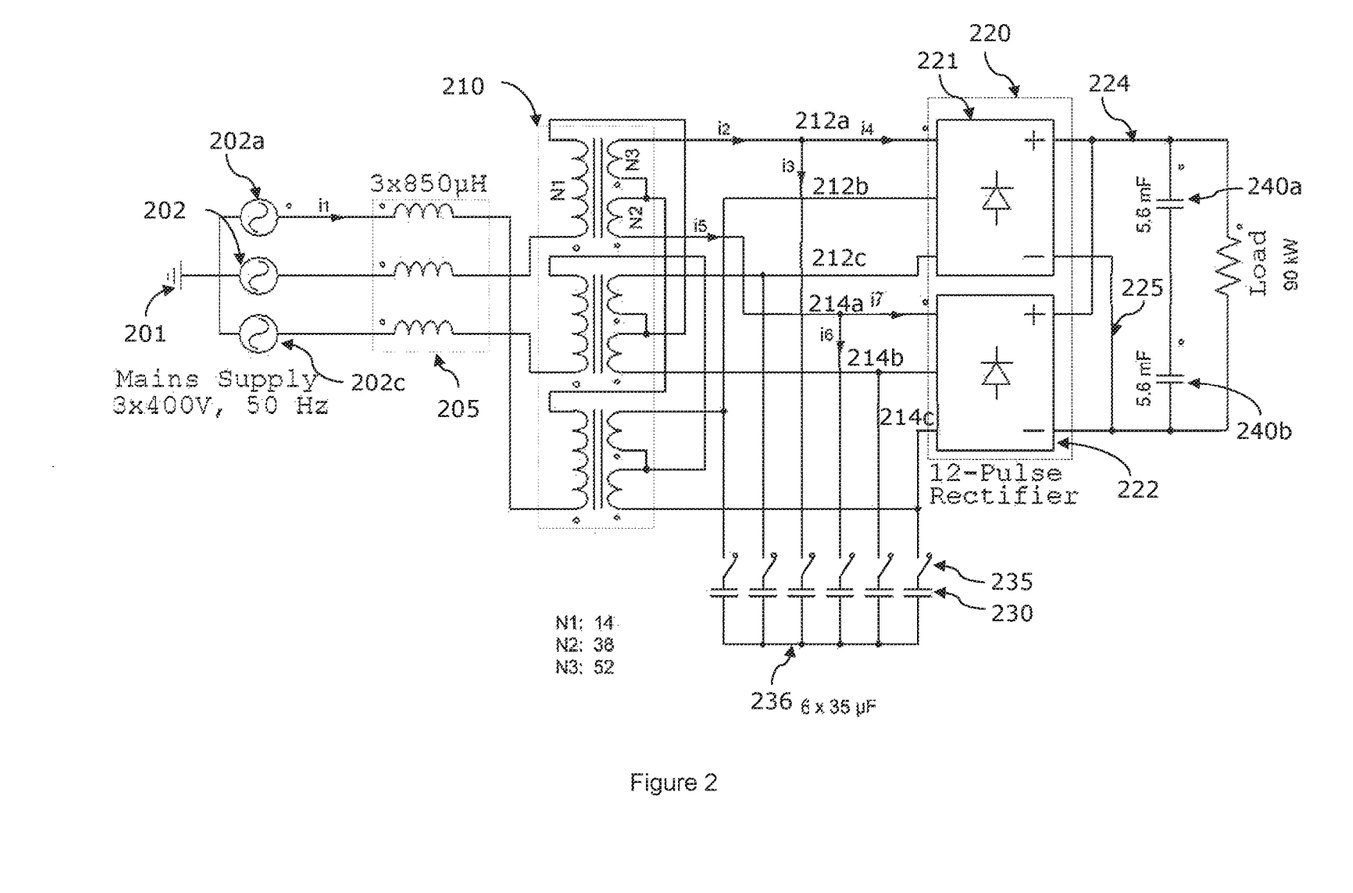
FIG. 2 shows a rectifier circuit according to the invention.

FIG. 2 shows a circuit of an embodiment of the invention.

The circuit has been realized with the following parameters.

Rated current and voltage: 140 A and 3×400 $V_{pp}$
Rated power: 90 kW
PFC capacitor 230: 35 uF
Inductance/line choke 205: 850 uH.

FIG. 2 shows the three phase power input 202, comprising three Thévenin equivalents 202*a*, 202*b* and 202*c*, commonly connected to ground 201 at one terminal and the other terminal connected to the line choke or series inductance 205. The inductance 205, is in the present embodiment three windings 205*a*, 205*b*, 205*c* wound on a tree limb core with separate air cap for each phase. The air gap is not shown in the Figure, but is known to the skilled person.

In an embodiment the three inductances 205*a*, 205*b*, 205*c* are wound on three separate magnetic cores, each with an air gap.

The rectifier 220 of FIG. 2 is non-linear and then harmonics are present in the power line. To cope with the harmonics' problem, the inductor 205 and the magnetic current splitter 210 are used: the main function of the inductor 205 is delaying currents in respect to the voltage phasors of the three-phase power line 202; the main function of the magnetic current splitter 210 is splitting each of the three currents, into two phase shifted currents.

This will help to reduce harmonics that are caused when the mains is rectified to create a DC link. They will also reduce the peak currents drawn by the inverter or other device. They also help to protect the input rectifier from some mains problems. In general harmonics are seen as a source of losses in the distribution grid so they are normally avoided or seen as harmful.

Figure 3A:
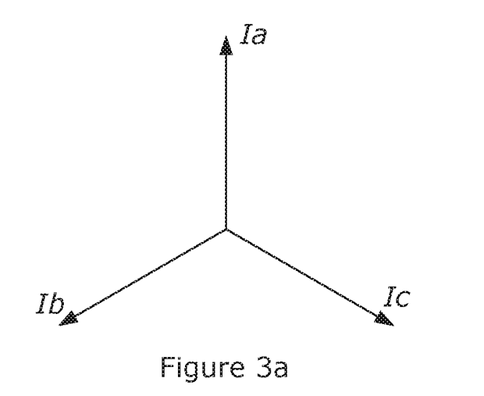
FIG. 3a shows three current vectors with 120 degrees displacement.

The three-phase electric power input 202 supplies three approximately sinusoidal voltages with 120 degrees phase shift. The phase shift between the three input currents i1*a*, i1*b*, and i1*c* flowing in the three current inputs is then equal to 120 degrees as illustrated in FIG. 3A. The amplitude and the frequency of the line voltages will vary according among others to local regulations, but the frequency will be equal, in most applications, to 50 Hz or 60 Hz, and the voltage is usually comprised between 100 V and 1 kV, for example 400 V rms between phases. The frequency of 50 Hz or 60 Hz or the frequency of the power grid will be referred to in the following as the fundamental frequency of the system.

Each of the currents flowing in the three current inputs and having the reference i1*a*, i1*b*, or i1*c* will be named in the following as the common current.

When the devices 210 are connected between the three phase power grid 202 and the rectifier 220, they split each of the common currents i1*a*, i1*b*, and i1*c* into two or more currents flowing in each current output. In the case shown in FIG. 2, they split each of the current i1*a*, i1*b*, and i1*c* into two currents. All the currents 212*a*, 212*b*, 212*c*, 214*a*, 214*b*, 214*c* flowing in the current outputs have all the same amplitude and are phase shifted of a predetermined angle, in respect to the corresponding fundamental components flowing in the current input.

The value of the angle is for example 30 degrees, so that the phase shift between the two split currents, for example 212*a* 214*a* and the corresponding common current, in this case i1, is respectively of plus 15 degrees and minus 15 degrees. As discussed, a common current, for example i1*a*, is split into two split currents: a first split current 212*a*, leading split current, and a second split current 214*a*, lagging split current. Split current 212*a*, 212*b*, 212*c* are leading split currents and 214*a*, 214*b*, 214*c* are lagging split currents.

Figure 3B:
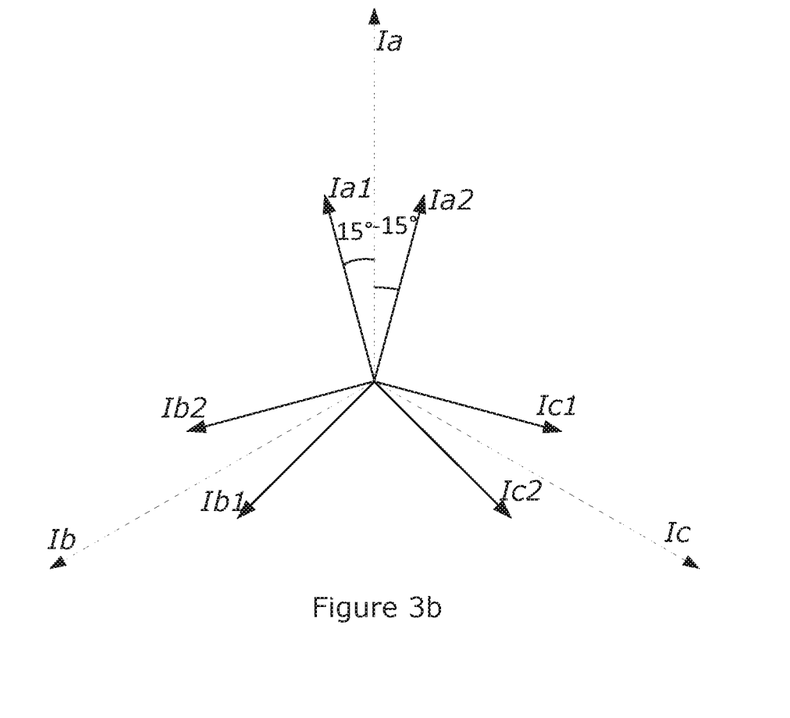
FIG. 3b shows sets of currents vectors.

If the value of the angle between the two output currents is 30 degrees, as mentioned, then the length of the phasors Ia1, Ia2 Ib1, Ib2, Ic1 and Ic2 in FIG. 3B, which is the same for all represented phasors, is 51.76% of the length of each phasor of Ia, Ib, and Ic, due to the current split and the trigonometry.

The presence of the three-phase inductor 205 before the magnetic split circuit 210 causes a lagging angle or phase shift angle between each of the voltage phasors of the power grid 202 and the corresponding input currents i1.

The magnetic split circuit 210 is connected to a 12-pulse rectifier followed by a DC link and a generic DC load 250. In a system comprising a three-phase power line 202, magnetic split circuit 210, a 12-pulse rectifier 220 and a DC link, an inductor or a choke can be used to have a continuous-conduction mode.

Continuous-conduction mode means that the rectifier current never goes to zero during period of the power line. On the contrary, in discontinuous-conduction-mode the current can go to zero during part of the period of the power line. In the discussed examples, the continuous-conduction mode is ensured by the three-phase inductor 205.

The size of the phase inductors 205*a*, 205*b*, 205*c* depends on the wanted distortion, for this example described here a 5% distortion is used. The specific inductance value also depends on the rated current and frequency as the impedance of phase inductor is given by:

$$Z = \omega L = 2\pi f L$$

It is normal to design the inductor according to a specific voltage drop across the inductor, at rated current, as a ratio of the rated voltage, or according to the per unit system p.u.

In the example is the rated current 140A and the inductance 205 is 850 uH, this leads to a voltage drop of 37V over the inductance 205, equal to 16% or 0.16 p.u.

Thus, the higher the rated current, the higher the specific voltage drop across the inductor.

In an embodiment the inductor 205 is designed to be 0.1 p.u. to 0.2 p.u.

In an embodiment the inductor 205 is inserted in series between the magnet splitter circuit 210 and the rectifier 220, while the magnet splitter circuit 210 is connected to the three phase power input 202. In this embodiment each of the six phase inputs of the rectifier need an inductor.

The magnetic splitter circuit 210 is a complex magnetic circuit, although it offers no galvanic isolation, i.e. it is much smaller and weighs less than a magnet system with galvanic isolation.

The magnetic splitter circuit 210 in FIG. 2 is a current splitter meaning that it is the currents that are phase shifted instead of the voltage, known from other simpler magnetic splitter couplings, nevertheless these voltage magnetic splitter couplings will also benefit from the use of PFC capacitors.

The magnetic current splitter circuit 210, in the example described, has the following turn ratio or number of turns: N1:14, N2:38, and N3:52

As one can see in FIG. 2 is the magnetic current splitter circuit 210 is divided into three sections and each sections are constructed with the above mentioned turn ratio.

In addition to the use of a six phase magnet splitter circuit 210, embodiments using nine and twelve phases, and thereby feeding 18 or 24 pulse rectifiers, would also benefit from the invention of connecting PFC capacitors in parallel, between the splitter and the rectifier.

In an embodiment the twelve pulse rectifier 220 is split into two six pulse rectifiers 221, 222, where each rectifier receives a three phase current 212, 214.

In an embodiment the twelve pulse rectifier 220 consists of six rectifier legs 227 where each rectifier leg 227 receives a phase from the three phase currents 212a, 212b, 212c, 214a, 214b, and 214c.

The three phase current system 212 is in an embodiment phase shifted 30 degrees from the three phase current system 214. The phase shift in the current happens due to the layout of the magnetic splitter circuit 210, i.e. the number of turns, in fact one three phase system is lagging 15 degrees and the other is leading 15 degrees in respect of the input current.

Other phase shifts may occur in other embodiment. The advantage of using 30 degrees is that the $5^{th}$ and the $7^{th}$ harmonics are cancelled. So are also harmonics of the order 17 and 19, 29 and 31, leaving the lowest order ripple harmonic in the DC at the order 12.

In the FIG. 2 the magnetic splitter circuit 210 is shown as an auto transformer.

Each rectifier 221, 222 feeds it rectified DC power into a positive terminal 224 and a negative terminal 225, whereby the DC outputs of the rectifiers 221, 222 are parallel connected. The positive terminal 224 and the negative terminal 225 connects respectively to a DC capacitor 240, and to a load 250. The DC capacitor 240, may consist of a plurality of parallel connected capacitors 240 (FIG. 2 only shows this as one capacitor).

Depending on the DC voltage level, the DC capacitor 240, may be a stack of a plurality of capacitors connected in series, 240a, 240b. Thus in an embodiment the DC link capacitor 240 consist of at least two capacitors 240a, 240b connected in series.

In another embodiment the DC capacitor 240 is a single capacitor.

The power factor correction (PFC) capacitors 230 help to correct the power factor of the rectifier. The PFC capacitors 230 are each connected to an output phase of the magnet splitter circuit 210 in one end.

The PFC capacitors 230 are all connected to a single common point 236 in the other end, or the capacitors 230 can be grouped into two, so the three capacitors 230 connected to rectifier 221 are terminated at a first common point and the three capacitors 230 connected to rectifier 222 are terminated at a second common point, the first and second common point are not shown in FIG. 2.

In an embodiment the PFC capacitors are commonly connected two and two, i.e. one capacitor connected to point 212a and one connected to point 214a each two capacitors are commonly connected, and similar for the other input of the rectifier 220. As two capacitors in series can be seen as one capacitor, it means that in fact only one capacitor is connected between 212a and 214a.

The PFC effect of this embodiment is not as good as for the circuit of FIG. 2.

The capacitance of the capacitors 230 is chosen so the power factor (PF) reaches unity at full load. A further increase in the capacitance would shift the current from either a unity or lacking power factor, to a leading power factor, this will be discussed more latter.

In the presented example the PFC capacitors has a capacitance value in of 35 uF.

In an embodiment the capacitance of the PFC capacitors is in the range of 10 uF to 100 uF.

In an embodiment the capacitance of the PFC capacitors is in the range of 20 uF to 40 uF.

The positive effect of the PFC capacitors 230 is more dominated the higher the load on the rectifier is. It is therefore desirable to disconnect the PFC capacitor 230 from the circuit when the load is low. This can be achieved by connecting the PFC capacitors to the circuit through an electrical switch 235, which can be activated by energizing a magnetic coil winding (not shown in the Figures).

In an embodiment the electrical switch is a solid state type of switch.

The control system (not shown in the Figures) of the rectifier can have a predetermined threshold load value of where the power factor in fact is lower when the PFC capacitor is connected.

In an embodiment of the invention the control system disconnects the PFC capacitor when the load on the rectifier is below a load threshold.

In an embodiment of the invention the load threshold, for where power factor is better without the PFC capacitors 230, is about 40%-50% of full load.

Similar as for the power factor, but with opposite sign, the distortion factor is increased for low load value, thus it is desirable, not to have the PFC capacitors connected when the load is low.

In an embodiment each of the capacitors 230 are divided into a plurality of smaller capacitors, and each of the plurality of smaller capacitors can be connected to the circuit through a switches. Instead of connecting all the capacitance to the circuit, this embodiment allows connection of the capacitances in steps, and thereby providing more optimal operational points.

In an embodiment the capacitance of each of the plurality of capacitors is arranged so a binary combination in the capacitance is possible.

In an embodiment the size of the PFC capacitors are selected so the power factor of the rectifying circuit reaches nearly unity, at full load.

Figure 4:
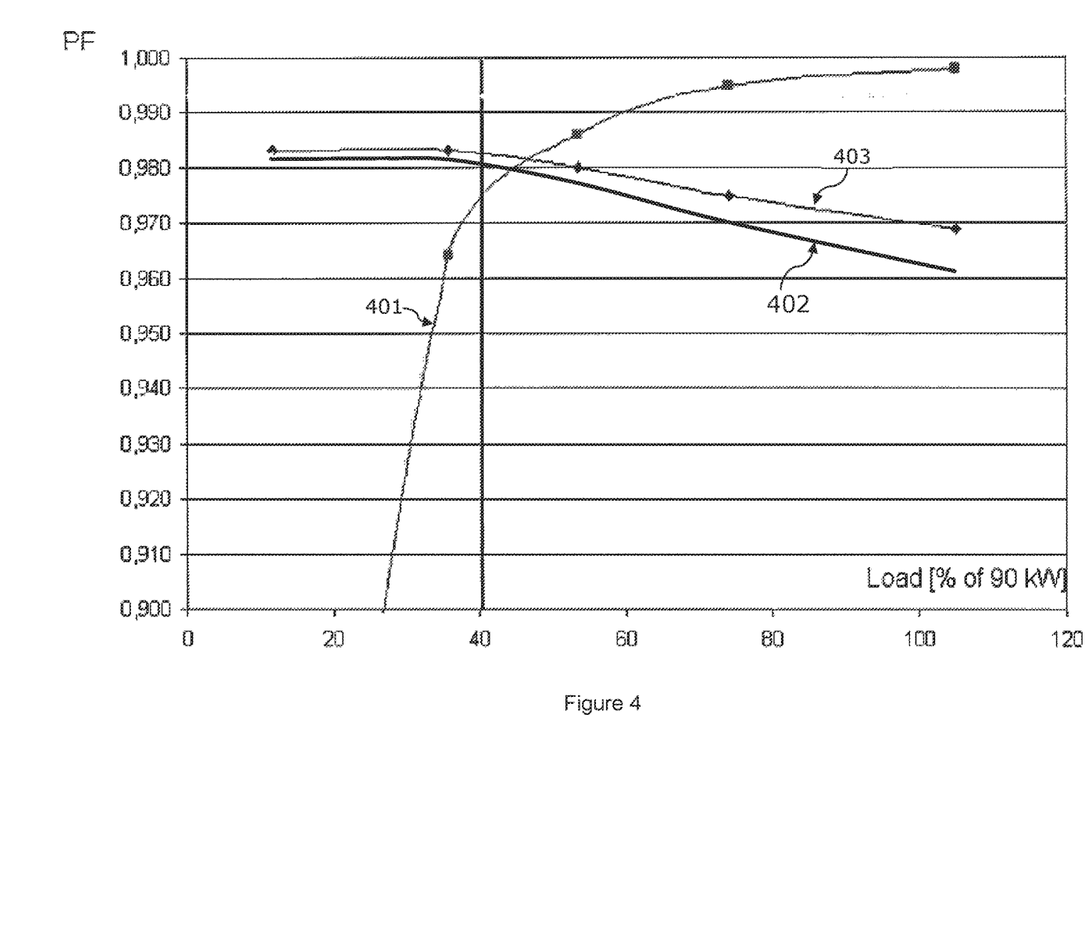
FIG. 4 shows power factor as a function of the load.

FIG. 4 shows the relationship between load and power factor, where the load is represented on the x-axis as a percentage of full load of a 90 kW setup according to FIG. 2. The y-axis represents the power factor. The curve 401 is the relationship where PFC capacitors 230 of a value of 35 µF each are connected to the circuit at any load percentage, and with a grid choke 205 of 850 µH, at a grid operating frequency of 50 Hz.

The curve 402 is the load vs power factor relationship without the PFC capacitors 230 and still with a grid choke 205 of 850 µH, at a grid operating frequency of 50 Hz.

Similar curve 403 is the load vs power factor relationship without the PFC capacitors 230 and a smaller grid choke 205 of 650 µH, at a grid operating frequency of 50 Hz.

The curve 401 clearly shows that the power factor is worse, with the capacitor connected, than without them being part of the circuit, when the load is below 40-45%. It is thus desirable, only to have the capacitors 230 connected to the circuit, when the load is above 45% or like.

In an embodiment the load is of a nature where it is either running at a load above 45% or not running, thus it will not be advantageous to be able to disconnect the capacitors 230 through a switch 235.

The actual load 250 connected to the DC link terminals 224, 225 may vary. In an embodiment the load is a 400 Hz inverter for a 400 Hz AC ground power unit supplying power to air crafts while parked at an airport gate.

In another embodiment the load 250 is a pre-conditioned air unit, which is an air conditioning unit supplying fresh air to air crafts while parked at an airport gate. The supply of conditioned air to the aircraft is often required, either the ambient air is cooled or heated.

Although the above mentions two different areas of what the load 250 may be, the present invention is not limited to supply DC power to these two areas.

Figure 5:
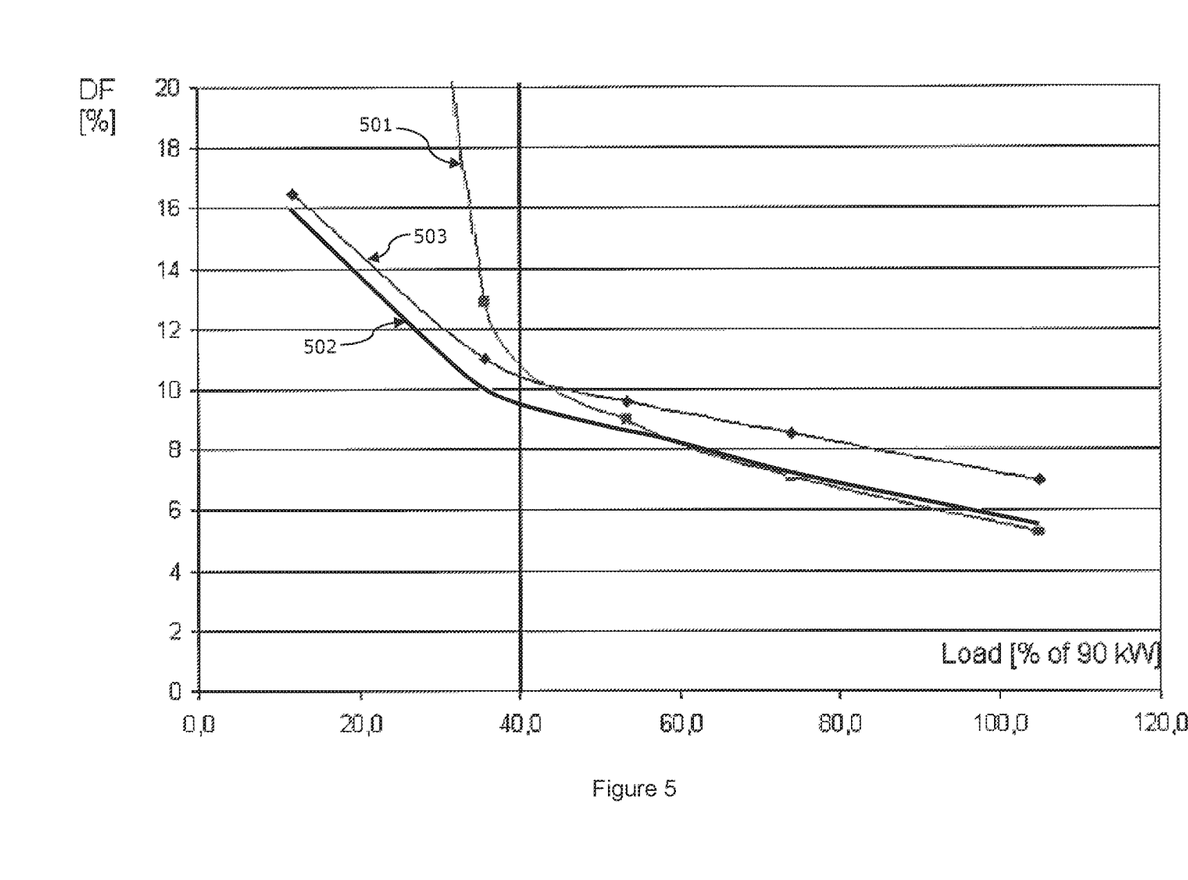
FIG. 5 shows distortion factor as a function of the load.

FIG. 5 shows relationship between load and distortion factor, where the load is represented on the x-axis as a percentage of full load of a 90 kW setup according to FIG. 2. The y-axis represents the distortion factor. The curve 501 represents the distortion factor when the PFC capacitors 230 of a value of 35 µF each are connected to the circuit at any load percentage, and with a grid choke 205 of 850 µH, at a grid operating frequency of 50 Hz.

The curve 502 shows the load vs distortion factor relationship without the PFC capacitors 230 and still with a grid choke 205 of 850 µH, at a grid operating frequency of 50 Hz.

Finally the curve 403 shows the load vs distortion factor relationship without the—PFC capacitors 230 and with a smaller grid choke 205 of 650 µH, at a grid operating frequency of 50 Hz.

Figure 6:
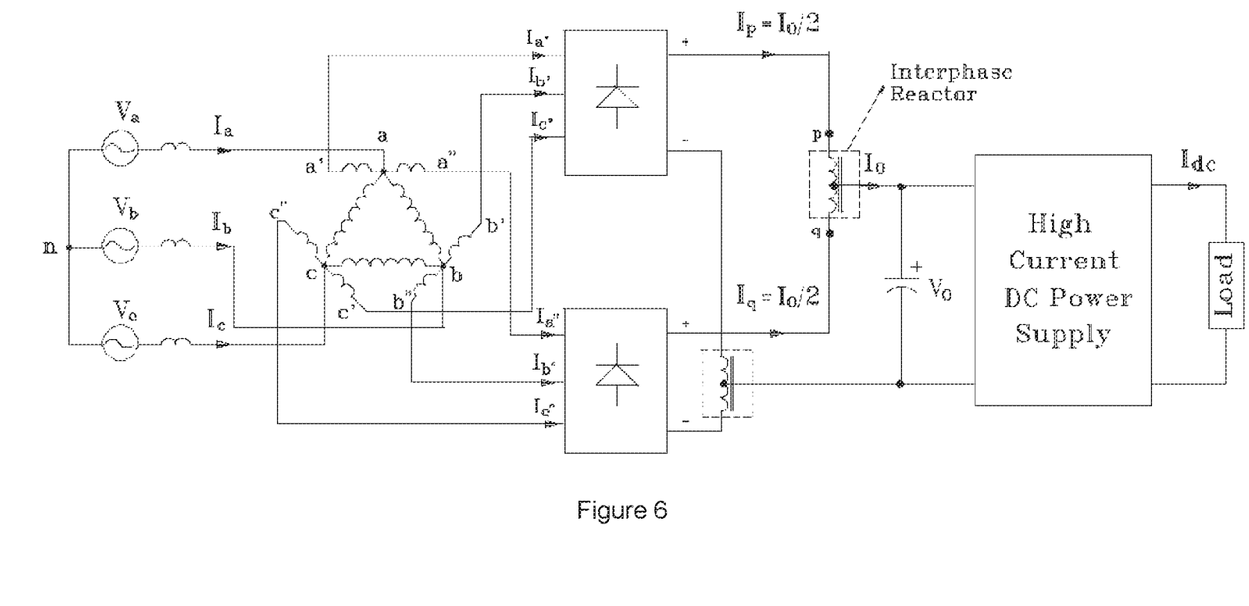
FIG. 6 shows another rectifier circuit where the invention can be applied.

FIG. 6 shows a rectifier circuit using another type of magnet splitter circuit which works like a voltage splitter opposed to the magnetic splitter 210 in FIG. 2, which works like a current splitter. The three voltage source Va, Vb, and Vc in FIG. 6 are connected to a magnetic autotransformer at a, b, and c, the voltage signals a' and a" has a phase displacement of +/−15 degrees from the signal Va.

Simulations have been made for a circuit of FIG. 6 including power factor correction (PFC) capacitors connected to a', b' and c', and then connected to a first common point at the other terminal and similar capacitors connected to a", b" and c", and then connected to second common point.

In an embodiment the first and second common point are connected to a single common point.

A disadvantage of the magnetic voltage splitter circuit in FIG. 6 compared to the magnet current splitter 210, in FIG. 2 is the need for interface reactors/transformers (see FIG. 6), in order to ensure load symmetry. Another advantage of the magnetic current splitter, compared to the magnetic voltage splitter is that it is smaller in its physical size The simulations show a similar improvement of the power factor and distortion factor as for the circuit in FIG. 2.

The simulation results for the circuit in FIG. 2 will now be presented, all the simulations are made with nominal load of 90 kW.

Figure 7:
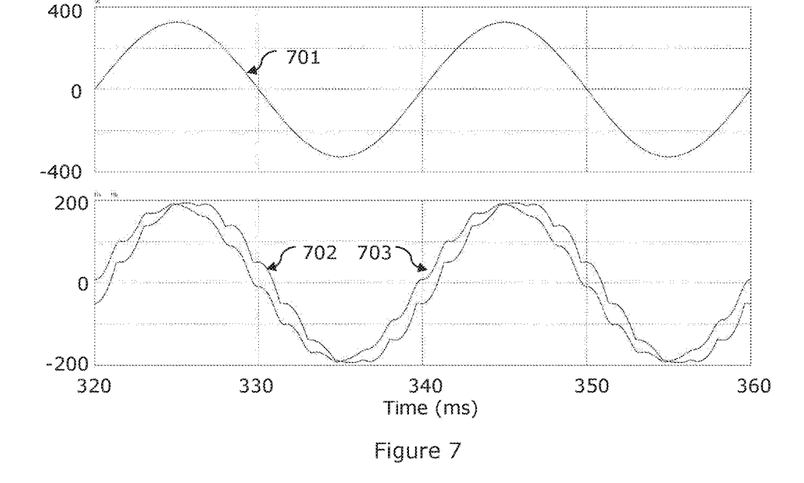
FIG. 7 shows grid voltage and grid current with and without PFC capacitors.

FIG. 7 shows grid voltage and grid current with and with PFC capacitors. The upper FIG. 7 shows the voltage signal 701 phase to ground 201, the voltage level is 231 Vrms.

The lower FIG. 7 shows two different simulations of the current i1 drawn from the source 202a. The current 702 is without the PFC capacitor connected and it has a current level of 138.0 Arms. The other current 703 is with the PFC capacitor connected and it has a current level of 132.7 Arms. The current 703 leads the current 702, as one would expect as the PFC capacitors improves the power factor.

Figure 8:
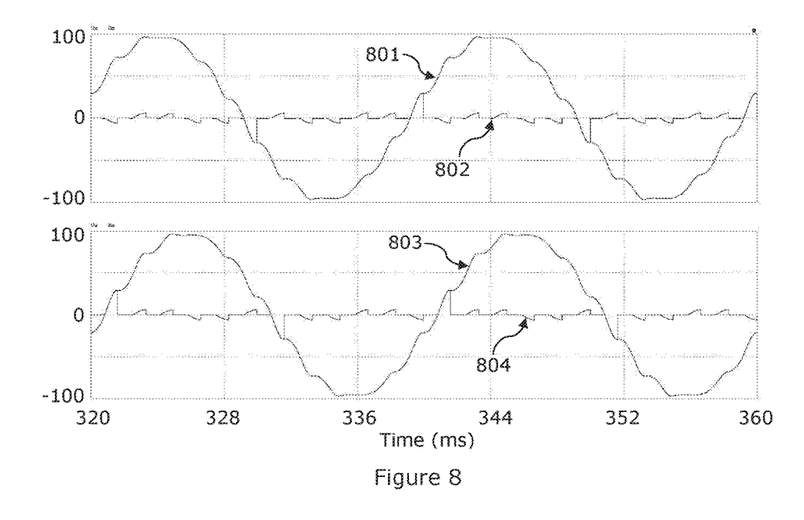
FIG. 8 shows the current in the splitter circuit and in the PFC capacitor, for a phase current split into two currents.

FIG. 8 shows the current in the splitter circuit and in the PFC capacitor, for a phase current i1 split into two currents i2 and i5.

The Upper FIG. 8 trace 801 shows the current i2 out of the magnetic current splitter 210, the trace 802 shows the current i3 which is the current flow in one 35 uF PFC capacitor 236. It is clear from trace 802 that the current i3 PFC capacitor 236 causes a higher pulse after each zero crossing, i.e. the PFC capacitor can be seen as it helps the commutation in the diode.

The lower FIG. 8 trace 803 shows the current i5 out of the magnetic current splitter 210, the trace 804 shows the current i6 which is the current flow in another 35 uF PFC capacitor 236. Similar as for trace 804, here the extended current pulses also occur after the current zero crossing.

The current i2 and the current i5 as shown as trace 801 and 803 respectively are 30 degrees shifted as expected.

The current 801 has a value of 68.7 Arms, while the current 802 in the PFC capacitor (I3a)=6.4 Arms (with 2.5 Arms in the fundamental frequency). The size of the current 803 and 804 are of same sizes.

Figure 10:
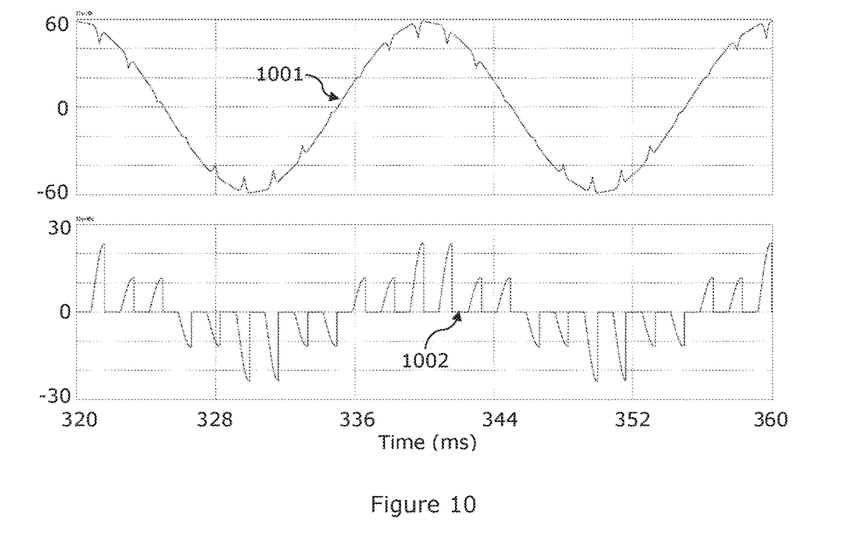
FIG. 10 shows the current difference between simulations with and without PFC capacitors. Lower part of Figure shows the sum of currents in two PFC capacitors.

The sum of the current i3+i6 is shown in the lower FIG. 10 as trace 1002, with 12-pulses per period. Similar plots can be made for the other phase, but with 120 degrees displacement. The current sum (I3+I6) is 8 Arms (4.7 A fundamental frequency)

Figure 9:
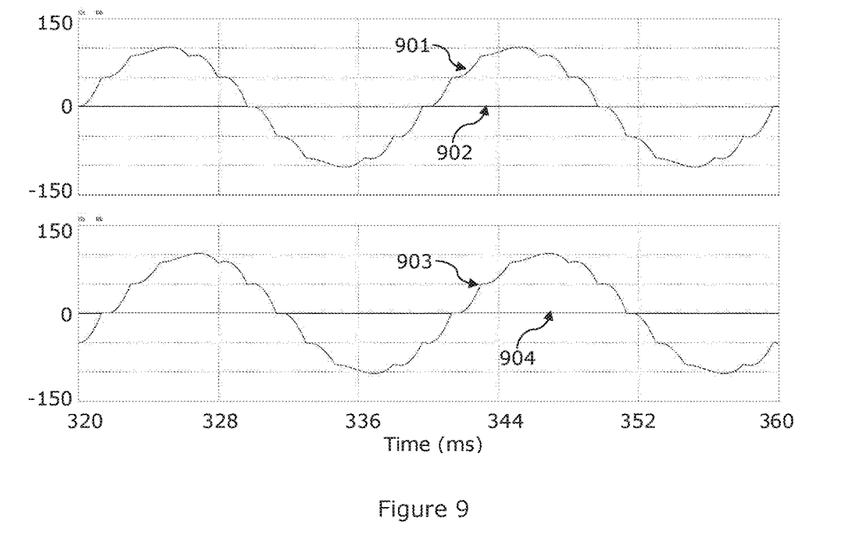
FIG. 9 shows the current in the splitter circuit with the PFC capacitors disconnected, for a phase current split into two currents.

FIG. 9 shows the current in the splitter circuit with PFC capacitors disconnected, for a phase current i1 split into two currents i3 and i5. The Upper FIG. 9 trace 901 shows the current i2 out of the magnetic current splitter 210, the trace 902 shows the current i3 which is the current flow in one 35 uF PFC capacitor 236, but the capacitor 236 is not connected as switch 235 is open, thus the current i3 is zero.

Similar the lower FIG. 9 trace 903 shows the current i5 out of the magnetic current splitter 210, the trace 904 shows the current i3 which is the current flow in one 35 uF PFC capacitor 236, but the capacitor 236 is not connected as switch 235 is open, thus the current i3 is zero The current 901 has a value of 71.4 Arms, while the current 902 in the PFC capacitor (I3)=0 Arms. The size of the current 903 and 904 are of same sizes.

FIG. 10 upper part shows the supply current i1 difference between simulations with and without PFC capacitors. The current difference in trace 1001 has size of 40 Arms, which in principle is the improvement in the reactive current provided by the PFC capacitors, i.e. without the PFC capacitor 236 a flow of additional 40 A(rms) reactive current would have been required.

Figure 11:
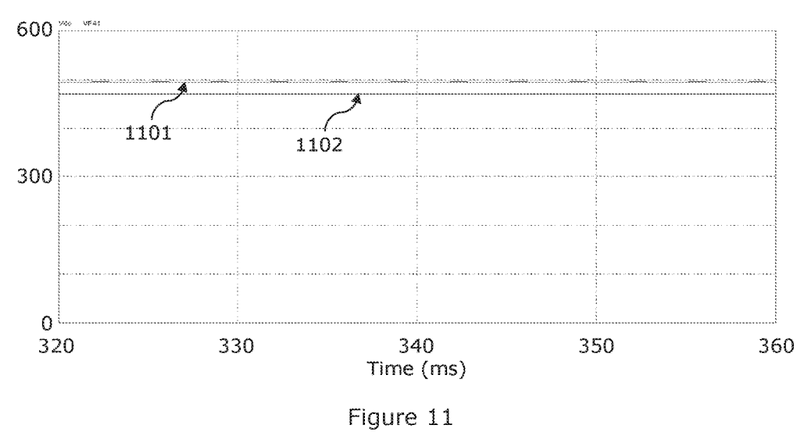
FIG. 11 shows the DC voltage level with and without the PFC capacitors.

FIG. 11 shows the DC voltage level with and without the PFC capacitors. Here is another improvement of the circuit with the PFC capacitors 236. Voltage trace 1101 is with the capacitors connected, here the DC link voltage is 495 Vdc. The lower Voltage trace 1102 is without the PFC capacitors 236 connected, the DC voltage level is 470 Vdc. This means an improvement in the DC voltage level of 25 Vdc or 5.3%, which leads to lower currents in the rest of the circuit with the same load.

Likewise, the rated apparent power (S) of the grid choke 205 can be reduced as a result of the increased power factor:

$S_{rated}$ with PFC-caps.=2×Phi×50×0.00085× 132.7$^2$=4702 VA $S_{rated}$ without PFC-caps.=2×Phi×50×0.00085× 138$^2$=5085 VA (+8%)

The size of the grid choke 205 sets the length of the commutation time between respective diodes. The PFC capacitors ensure that the commutation of each diode happens freely and thus the current and voltage remains in phase with each other.

Figure 12:
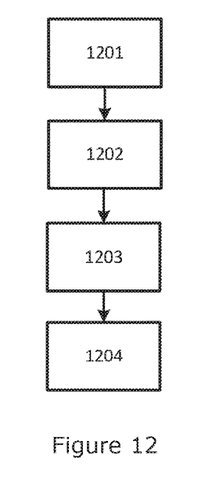
FIG. 12 is a schematic flow-chart representing the method according to the invention.

FIG. 12 shows a flow chart of a method according to an aspect of the invention for rectifying electrical power to reduce a harmonic distortion factor and/or increasing a power factor. Step 1201 is receiving a three phase power input, through three phase inductances, the three phase inductances being connected in series with the three phase power input and a magnetic splitter circuit, step 1202 is splitting the three phase power input in the magnetic splitter circuit, into a first three phase system and a second three phase system, said first three phase system having signals lagging signals of the second three phase system, step 1203 is correcting the power of the first and second three phase system by a plurality of PFC capacitors, each comprising first and second terminals, said first terminals connected to respective input terminals of a twelve pulse rectifier, and said second terminals connected to a common electrical point, and step 1204 is rectifying the power of the first and second three phase system in the twelve pulse rectifier with six input terminal to connect the first and the second three phase system.

In summary the invention relates to a rectifier circuit being arranged for rectifying electrical power, comprising a three phase power input, a magnetic splitter circuit being arranged for receiving the three phase power input and splitting the three phase power into a first three phase system and a second three phase system, the first three phase system having signals lagging signals of the second three phase system, a twelve pulse rectifier with six input terminal to connect the first and the second three phase system, and to generate a rectified electrical power at a power output, three phase inductances being connected in series with the three phase power input and the magnetic splitter circuit, and a plurality of power factor correction (PFC) capacitors, each comprising first and second terminals, said first terminals being connected to respective input terminals of the twelve pulse rectifier, and the second terminals being connected to at least one common electrical point.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A rectifier circuit being arranged for rectifying electrical power, comprising:
   a three phase power input,
   a transformer being arranged for receiving the three phase power input and splitting the three phase power into a first three phase system and a second three phase system, said first three phase system having signals lagging signals of the second three phase system,
   a twelve pulse rectifier with six input terminal to connect the first and the second three phase system, and to generate a rectified electrical power at a power output,
   a three phase inductance being connected in series with the three phase power input and the transformer,
   a plurality of power factor correction (PFC) capacitors, each comprising first and second terminals, said first terminals being connected to respective input terminals of the twelve pulse rectifier, and said second terminals being connected to at least one common electrical point.

2. The rectifier circuit according to claim 1, wherein the signals of the first and second three phase system, being a current signal.

3. The rectifier circuit according to claim 1, wherein the plurality of PFC capacitors are selected to have capacitances serving the purpose of reaching a unity power factor of the three phase power input at a nominal load.

4. The rectifier circuit according to claim 1, wherein the plurality of PFC capacitors comprises six capacitors, each having their first terminals connected to respective input terminals of the twelve pulse rectifier.

5. The rectifier circuit according to claim 1, wherein the twelve pulse rectifier comprises a plurality of diode switches.

6. The rectifier circuit according to claim 1, wherein the twelve pulse rectifier consists of two six pulse rectifier bridges.

7. The rectifier circuit according to claim 1, wherein the three phase inductance are three separate magnetic components each connected in series between the respective phase of the three phase power input and the transformer, said inductance having a value in the range of 0.1 p.u to 0.2 p.u.

8. The rectifier circuit according to claim 1, further comprises a second three phase inductance, wherein the three phase inductance is inserted in series between a first three phase system of the transformer and the rectifier, and the second three phase inductance is inserted in series between the second three phase system of the transformer and the rectifier.

9. The rectifier circuit according to claim 1, wherein the three phase inductances are integrated in the transformer, said transformer comprises one or more air gap(s).

10. The rectifier circuit according to claim 1, wherein each of the plurality of PFC capacitors are arranged to be connected to the circuit through electrical switches.

11. The rectifier circuit according to claim 10, wherein the electrical switches are arranged to be operated in an open mode, when the power output is below a threshold value.

12. The rectifier circuit according to claim 1, wherein each of the plurality of PFC capacitors has a capacitance value in the range of 20 uF to 40 uF.

13. Use of the rectifier circuit according to claim 1, wherein the rectifier circuit provides power to an air-conditioning unit or an air craft ground power supply unit.

14. The rectifier circuit according to claim 1, wherein the transformer is an auto transformer.

15. The rectifier circuit according to claim 1, wherein said first terminals of the plurality of PFC capacitors are connected to respective output terminals of the transformer in addition to the respective input terminals of the twelve pulse rectifier.

16. A method for rectifying electrical power to reduce a harmonic distortion factor and/or increasing a power factor, the method comprises:

receiving a three phase power input, through three phase inductances, the three phase inductances being connected in series with the three phase power input and a transformer, splitting the three phase power input in the transformer, into a first three phase system and a second three phase system, said first three phase system having signals lagging signals of the second three phase system, correcting the power of the first and second three phase system by a plurality of PFC capacitors, each comprising first and second terminals, said first terminals connected to respective input terminals of a twelve pulse rectifier, and said second terminals connected to a common electrical point, rectifying the power of the first and second three phase system in the twelve pulse rectifier with six input terminal to connect the first and the second three phase system.

* * * * *